(12) United States Patent
Tsukamoto

(10) Patent No.: US 6,458,171 B1
(45) Date of Patent: Oct. 1, 2002

(54) BATTERY TAB ATTACHMENT METHOD

(75) Inventor: Hisashi Tsukamoto, Saugus, CA (US)

(73) Assignee: Quallion LLC, Sylmar, CA (US)

( * ) Notice: Subject to any disclaimer, the term of this patent is extended or adjusted under 35 U.S.C. 154(b) by 0 days.

(21) Appl. No.: 09/421,472

(22) Filed: Oct. 19, 1999

Related U.S. Application Data

(62) Division of application No. 09/293,450, filed on Apr. 16, 1999, now Pat. No. 6,063,523.

(51) Int. Cl.[7] .............................. H01M 6/00; H01M 4/02
(52) U.S. Cl. ....................... 29/623.4; 29/623.1; 429/211
(58) Field of Search ................................ 429/211, 209, 429/218.1, 231.5, 161; 29/623.1, 623.3, 623.4

(56) References Cited

U.S. PATENT DOCUMENTS

| 4,895,705 | A | * | 1/1990 | Wrighton et al. | 422/68 |
| 5,565,280 | A | * | 10/1996 | Difrancesco | 429/34 |
| 5,582,936 | A | * | 12/1996 | Mrotek et al. | 429/241 |
| 5,773,164 | A | * | 6/1998 | Venkatesan et al. | 429/161 |
| 5,871,858 | A | * | 2/1999 | Thomsen et al. | 429/7 |
| 5,871,861 | A | * | 2/1999 | Hirokou et al. | 429/149 |

* cited by examiner

Primary Examiner—Stephen Kalafut
Assistant Examiner—R Alejandro
(74) Attorney, Agent, or Firm—M. Elezabeth Bush; Freilich Hornbaker & Rosen

(57) ABSTRACT

The difficulties encountered with attaching tabs to very thin metal layer. e. g., a layer of gold from 0.3 $\mu$m to 50 $\mu$m thick are severe. Typically, in the uses envisioned for the thin metal layer, which is for a compact battery, a plastic sheet such as polyimide underlies the thin metal layer. Polyimide has a relatively low melting point. The thin polyimide substrate melts when resistance welding is used. Ultrasonic welding doesn't work because the sound wave energy is absorbed by the polyimide. This invention solves the attachment problem by using wire bonding to the thin metal sheet and to its tab. The tab attachment for a thin metal layer comprises a thin metal layer, a metal tab, and a wire and the wire is bonded to the thin metal layer and the wire is bonded to the metal tab. The thin metal layer may be gold; the thickness of the gold is between 0.3 $\mu$m and 50.0 $\mu$m.

6 Claims, 2 Drawing Sheets

BATTERY TAB ATTACHMENT METHOD

This is a division of application Ser. No. 09/293,450, field Apr. 16, 1999, now U.S. Pat. No. 6,063,523.

FIELD OF THE INVENTION

This invention relates to attaching tabs onto layered metal battery components for tapping the battery-developed voltage and current.

BACKGROUND OF THE INVENTION

The attachment to battery tabs of a connecting conductor is relatively easy where the tab metal is reasonably thick and it does not contact a layer of low melting point plastic. Resistance welding or laser welding provide comparatively easy solutions. For example, Morris used spot welding for his battery's tabs (U.S. Pat. No. 5,585,206). Narukawa et al. used ordinary laser welding to both connect the tab collector to the casing and to seal the casing. The problem which this invention solves is the attachment of tabs to the conducting metal of the battery, such as in the battery of a co-pending U.S. patent application, Ser. No. 09/289,071, filed Apr. 8, 1999, now U.S. Pat. No. 6,280,873. In that battery, the metal conducting layers of the positive and negative electrodes are in the range of 0.3 to 3 $\mu$m and adhere to a thin layer of polyimide which might be about 9 $\mu$m thick. Consequently, extreme care is required, otherwise the polyimide plastic will melt leading to short circuits within the battery, and the conducting metal itself may also be damaged. Therefore, a small controlled amount of external energy must be used to effect the attachment or bonding.

SUMMARY OF THE INVENTION

The difficulties encountered with attaching tabs to very thin metal layer, e. g., a layer of gold from 0.3 $\mu$m to 50 $\mu$m thick are severe. Typically, in the uses envisioned for the thin metal layer, which is for a compact battery, a plastic sheet such as polyimide underlies the thin metal layer. Polyimide has a relatively low melting point. The thin polyimide substrate melts when resistance welding or ordinary laser welding is used. Ultrasonic welding doesn't work because the sound wave energy is absorbed by the polyimide.

This invention solves the attachment problem by using wire bonding to attach a tab to the metal layer

BRIEF DESCRIPTION OF THE DRAWINGS

The above and other features and advantages of the invention will be more apparent from the following detailed description wherein.

DETAILED DESCRIPTION OF THE PREFERRED EMBODIMENT

The following description is of the best mode presently contemplated for carrying out the invention. This description is not to be taken in a limiting sense, but is merely made for the purpose of describing the general principles of the invention. The scope of the invention should be determined with reference to the claims.

Figure 1:
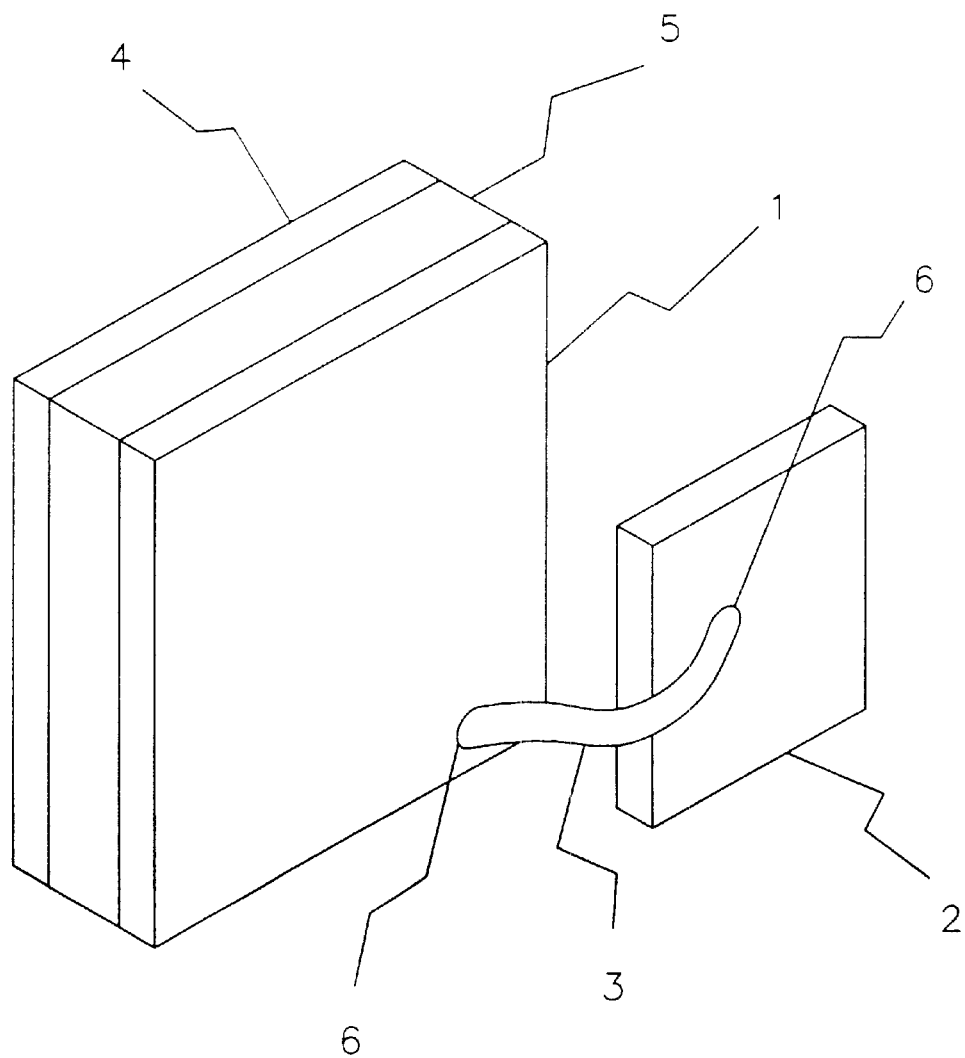
FIG. 1 shows the thin metal layer, the tab, and the wire bonded to each.

This invention solves the attachment problem by using wire bonding to the thin metal sheet and to its tab. FIG. 1 show the thin metal layer (1), the tab (2), and the wire (3) bonded to each other by wire bonding (6).

The difficulties encountered with attaching tabs (2) to a thin metal layer (1), e. g., a layer of gold from 0.3 $\mu$m to 50 $\mu$m thick are severe. The metal is so thin that resistance welding doesn't work because the metal layer(s) (1) and (4) are attached to a layer of relatively low melting point of polyimide (5). It melts the polyimide layer (1) as it heats it up. A similar circumstance occurs when using ordinary laser welding. Ultrasonic welding doesn't work because the sound wave energy is absorbed by the underlying absorbent polyimide.

This invention solves the attachment problem by using wire-bonding (6) to the thin metal layer (1) and to its tab (2). This method for tab attachment for a thin metal layer (1) utilizes the steps of wire bonding (6) one end of a wire (3) to a thin metal layer (1) and wire bonding (6) the other end of the (3) wire to a metal tab (2). The tab attachment for a thin metal layer comprises a thin metal layer (1), a metal tab (2), and a wire (3) and the wire (3) is bonded to the thin metal layer (1) and the wire (3) is bonded (6) to the metal tab (2). The thin metal layer (1) may be gold or aluminum for the positive electrode. For the negative terminal the thin layer may be titanium, iron, stainless steel, or gold. The thickness of the thin metal layer is between 0.3 $\mu$m and 50.

Figure 2:
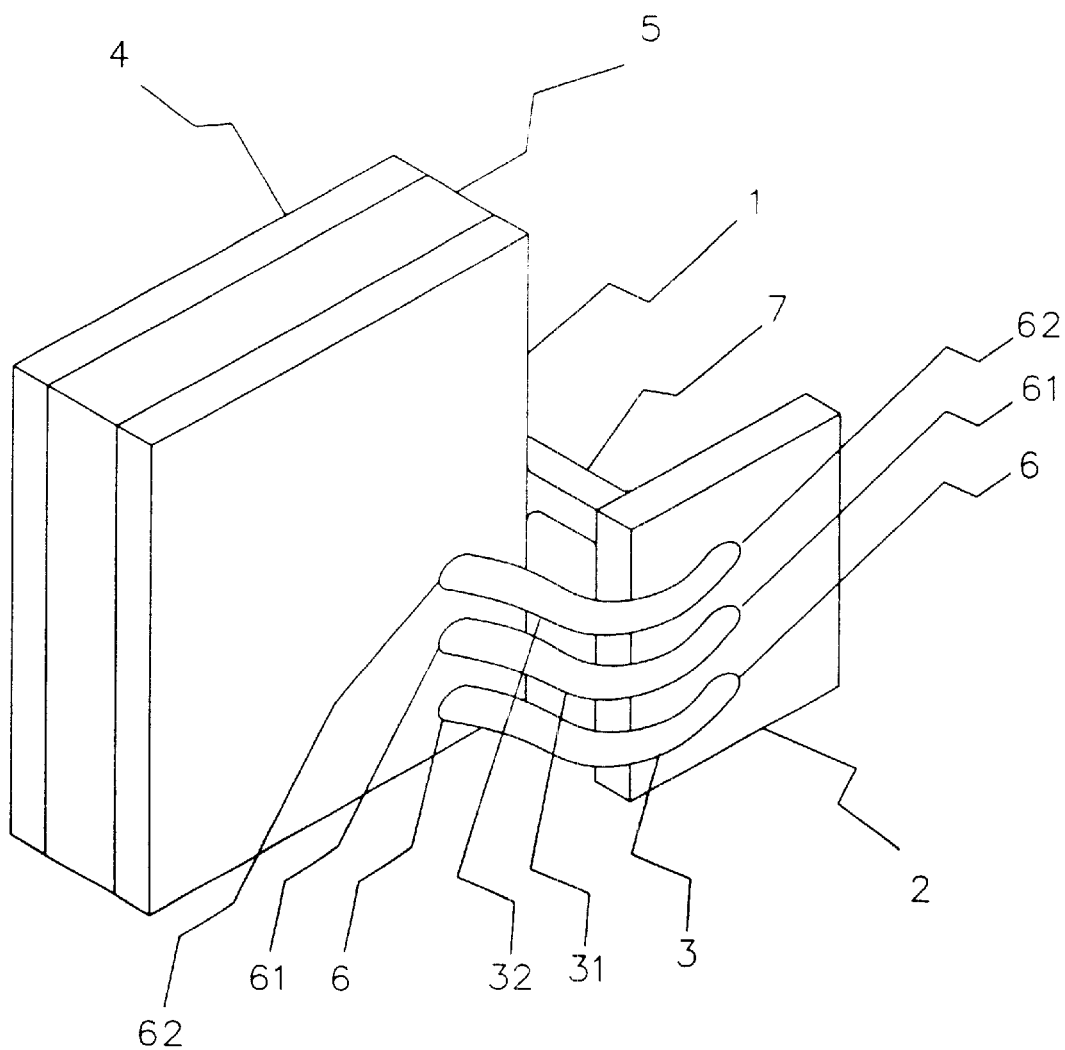
FIG. 2 shows FIG. 1 with additional wires bonded and with mechanical support shown.

FIG. 2 shows everything as in FIG. 1, but also shows additional bonded wires (31, 32) with wire bonding at (61) and (62) and a mechanical bond (7), which may be tape, glue, or adhesive.

While the invention herein disclosed has been described by means of specific embodiments and applications thereof, numerous modifications and variations could be made thereto by those skilled in the art without departing from the scope of the invention set forth in the claims.

What is claimed is:

1. A method for attaching a metal tab to a thin metal layer laminated on a thin plastic layer, said method comprising the steps of:

wire bonding a first end of a wire to said thin metal layer; and wire bonding a second end of said wire to said metal tab; wherein said thin metal layer has a thickness of between 0.3 $\mu$m and 50 $\mu$m.

2. The method of claim 1 wherein said thin metal layer comprises a material selected from the group consisting of gold, aluminum, titanium, iron, and stainless steel.

3. The method of claim 1 wherein said wire comprises a material selected from the group consisting of gold, aluminum, titanium, iron, and stainless steel.

4. The method or claim 1 wherein said wire has a diameter of between 10 $\mu$m and 50 $\mu$m.

5. The method of claim 1 wherein said tab comprises a material selected from the group consisting of gold, aluminum, titanium, iron, and stainless steel.

6. The method of claim 1 wherein said tab has a thickness of between 30 $\mu$m and 80 $\mu$m.

* * * * *

UNITED STATES PATENT AND TRADEMARK OFFICE
CERTIFICATE OF CORRECTION

PATENT NO. : 6,458,171 B1
DATED : October 1, 2002
INVENTOR(S) : Hisashi Tsukamoto It is certified that error appears in the above-identified patent and that said Letters Patent is hereby corrected as shown below:

<u>Title page,</u>
Item [74], *Attorney, Agent, or Firm* delete "M. Elezabeth Bush; Freilich, Hornbaker & Rosen" and replace with -- M. Elizabeth Bush; Freilich, Hornbaker & Rosen --

<u>Column 2,</u>
Line 30, after "and 50." add the following:
-- The metal wire is selected from the group consisting of gold and aluminum, for a positive electrode; and is selected from the group consisting of gold, titanium, iron and stainless steel, for a negative electrode. The thickness of the wires is between 10 μm and 50 μm.
   The metal tab is selected from the group consisting of gold and aluminum, for a positive electrode; the metal tab is selected from the group consisting of gold, titanium, iron and stainless steel, for a negative electrodes. The thickness of the metal tabs is between 30 μm and 80 μm. --

Signed and Sealed this

Seventh Day of January, 2003

JAMES E. ROGAN
*Director of the United States Patent and Trademark Office*